US006884749B2

(12) United States Patent
Neal-Hawkins et al.

(10) Patent No.: US 6,884,749 B2
(45) Date of Patent: Apr. 26, 2005

(54) SUPPORTED CATALYSTS WHICH REDUCE SHEETING IN OLEFIN POLYMERIZATION, PROCESS FOR THE PREPARATION AND THE USE THEREOF

(75) Inventors: Karen L. Neal-Hawkins, Cincinnati, OH (US); Sandor M. Nagy, Naperville, IL (US); William J. Sartain, West Chester, OH (US); Kiran Gupte, Naperville, IL (US); Kenneth W. Johnson, West Chester, OH (US)

(73) Assignee: Equistar Chemicals L.P., Houston, TX (US)

( * ) Notice: Subject to any disclaimer, the term of this patent is extended or adjusted under 35 U.S.C. 154(b) by 10 days.

(21) Appl. No.: 10/272,789

(22) Filed: Oct. 17, 2002

(65) Prior Publication Data

US 2004/0077807 A1 Apr. 22, 2004

(51) Int. Cl.$^7$ .............................. C08F 4/64; B01J 31/00
(52) U.S. Cl. ...................... 502/120; 502/158; 526/128; 526/160; 526/165; 526/129; 526/943
(58) Field of Search ................................ 502/158, 120; 526/128, 160, 165, 943, 129

(56) References Cited

U.S. PATENT DOCUMENTS

| | | |
|---|---|---|
| 4,003,712 A | 1/1977 | Miller |
| 4,543,399 A | 9/1985 | Jenkins, III et al. |
| 4,588,790 A | 5/1986 | Jenkins, III et al. |
| 4,752,597 A | 6/1988 | Turner |
| 4,791,180 A | 12/1988 | Turner |
| 4,792,592 A | 12/1988 | Fulks et al. |
| 4,808,561 A | 2/1989 | Welborn, Jr. |
| 4,808,667 A | 2/1989 | Goko et al. |
| 4,855,370 A | 8/1989 | Chirillo et al. |
| 4,876,320 A | 10/1989 | Fulks et al. |
| 4,921,825 A | 5/1990 | Kioka et al. |
| 4,978,722 A | 12/1990 | Goko et al. |
| 5,006,500 A | 4/1991 | Chang |
| 5,026,795 A | 6/1991 | Hogan |
| 5,034,481 A | 7/1991 | Funk et al. |
| 5,037,905 A | 8/1991 | Cummings et al. |
| 5,041,584 A | 8/1991 | Crapo et al. |
| 5,064,802 A | 11/1991 | Stevens et al. |
| 5,066,631 A | 11/1991 | Sangokoya et al. |
| 5,153,157 A | 10/1992 | Hlatky et al. |
| 5,198,401 A | 3/1993 | Turner et al. |
| 5,240,894 A | 8/1993 | Burkhardt et al. |
| 5,241,025 A | 8/1993 | Hlatky et al. |
| 5,283,278 A | 2/1994 | Daire et al. |
| 5,329,032 A | 7/1994 | Tran et al. |
| 5,408,017 A | 4/1995 | Turner et al. |
| 5,414,180 A | 5/1995 | Geerts et al. |
| 5,416,178 A | 5/1995 | Winter et al. |
| 5,468,702 A | 11/1995 | Jejelowo |
| 5,504,049 A | 4/1996 | Crowther et al. |
| 5,529,965 A | 6/1996 | Chang |
| 5,552,358 A | 9/1996 | Speca |
| 5,554,704 A | 9/1996 | Burkhardt et al. |
| 5,599,761 A | 2/1997 | Turner |
| 5,635,437 A | 6/1997 | Burkhardt et al. |
| 5,637,660 A | 6/1997 | Nagy et al. |
| 5,648,440 A | 7/1997 | Sugano et al. |
| 5,663,249 A | 9/1997 | Ewen et al. |
| 5,863,853 A | 1/1999 | Vaughan et al. |
| 6,087,293 A * | 7/2000 | Carnahan et al. |
| 6,140,432 A | 10/2000 | Agapiou et al. |
| 6,172,168 B1 | 1/2001 | Winter et al. |
| 6,201,076 B1 | 3/2001 | Etherton et al. |
| 6,232,260 B1 | 5/2001 | Nagy et al. |
| 6,232,630 B1 | 5/2001 | Ramsbey et al. |
| 6,376,629 B1 | 4/2002 | Nagy et al. |
| 2002/0004448 A1 | 1/2002 | Agapiou et al. |
| 2002/0103072 A1 | 8/2002 | Patrick et al. |

FOREIGN PATENT DOCUMENTS

| | | |
|---|---|---|
| EP | 0560035 A1 | 9/1993 |
| WO | WO 94/07928 | 4/1994 |
| WO | WO 02/068483 A1 | 9/2002 |

OTHER PUBLICATIONS

Iiskola, E., et al., "Cyclopentadienyl Surface as a Support for Zirconium Polyethylene Catalysts," American Chemical Society, Macromolecules 1997, 30, 2853–2859.

Charoenchaidet, S. et al., "Borane–Functionalized Silica Supports In Situ Activated Heterogeneous Zirconocene Catalysts for MAO–free Ethylene Polymerization," Journal of Molecular Catalysis A:Chemical, 185 (2002) 167–177.

* cited by examiner

Primary Examiner—Caixia Lu
(74) Attorney, Agent, or Firm—Brooks Kushman P.C.

(57) ABSTRACT

Olefin polymerization in the presence of heterogeneous supported catalysts is improved by incorporating into the supported catalyst a unifunctional hydrophobic tether comprising a hydrophobic portion containing no basic nitrogen and a univalent reactive group. The unifunctional hydrophobic tether reduces fouling and sheeting in gas phase polymerization processes and improves polymer morphology and bulk density in slurry polymerization processes, while substantially maintaining or enhancing catalyst polymerization activity.

10 Claims, No Drawings

SUPPORTED CATALYSTS WHICH REDUCE SHEETING IN OLEFIN POLYMERIZATION, PROCESS FOR THE PREPARATION AND THE USE THEREOF

BACKGROUND OF THE INVENTION

1. Field of the Invention

The present invention is directed to an improvement in olefin polymerization in reactor systems employing heterogeneous single site catalysts supported on a porous inorganic support and employing an activator.

2. Background Art

Numerous processes exist for the preparation of polyolefins. The various processes may be divided into solution polymerization processes employing homogeneous (soluble) catalysts, and processes employing supported (heterogeneous) catalysts. The latter processes include both slurry and gas phase processes. All these processes are well known to those skilled in the art. The subject invention is directed to slurry and gas phase processes.

Prior olefin polymerization processes generally utilized the so-called Ziegler-Natta catalyst systems. In such systems, a variety of active transition metal compounds, many based on titanium and/or chromium compounds, employed trialkylaluminum compounds as co-catalysts. These catalyst systems are still used in large quantities today.

More recently, a variety of organometallic olefin polymerization catalysts have been developed. These are often termed "single site" catalysts because the polymerization is thought by some to occur at a single site on a complexed transition metal center. These catalysts have proven to be relatively inactive when alkylaluminums are employed as co-catalysts, but highly active in the presence of alumoxanes, particularly methylalumoxane, or in conjunction with a bulky, non-coordinating anion such as the tetrakis(pentafluorophenyl)borate anion. Many of these catalysts are bis, π-complexes of cyclopentadiene, i.e. "metallocenes," the simplest of which include bis(cyclopentadienyl)zirconium dichloride. Complexes containing but a single π-bonded cyclopentadienyl moiety, or three of such moieties may also be useful. These latter are sometimes termed "metallocene" catalysts herein, although the term "metallocene" conventionally applies only to bis(cyclopentadienyl) complexes. The cyclopentadienes may be substituted or unsubstituted, and may be linked through a variety of bridging groups. Examples of such catalysts may be found in numerous references, including U.S. Pat. Nos. 5,064,802; 5,198,401; 5,408,017; 5,504,049; 5,599,761; 5,663,249; 6,232,630; 6,232,260, and 6,376,629 incorporated by reference herein. In addition to the catalysts described above, a variety of multidentate metal complexes have been found to be effective olefin polymerization catalysts. Numerous examples may be found in the patent and non-patent literature, including the quinolinoxy catalysts described in U.S. Pat. No. 5,637,660. The term "organometallic catalyst" will be used herein for such catalysts. Because of their unique catalytic activity, metallocene catalysts are considered different from Ziegler-Natta catalysts by those skilled in the art, and polymerization processes and additives employed therein are ordinarily modified to take into account their differing properties.

The organometallic catalysts used as heterogeneous catalysts are supplied to the reactor on a porous support material such as porous alumina or silica, the latter being highly preferred. It has been found that by depositing the co-catalyst or activator (both terms are used somewhat interchangeably) onto the support as well, highly efficient supported catalysts can be obtained. The catalyst and activator can be deposited in many different ways, including both different orders of addition as well as in different modes of addition. Prereacted products of single site catalyst complexes and activator can also be deposited. It has been found that the various different deposition processes can result in unexpected differences in catalytic activity in some cases. Examples of supported catalyst preparation include U.S. Pat. Nos. 5,006,500; 5,468,702; 5,863,853; 5,240,894; 5,554,704; 5,635,437; 5,416,178; and 6,172,168, which are herein incorporated by reference.

Particularly in gas phase polymerizations, sheeting phenomena may occur which result in difficulties in maintaining continuous operation. Although numerous theories have been proposed for such phenomena, it is generally understood that polymer particles may adhere to the reactor walls, particularly at points of low polymer particle velocity. The adhering particles generate heat by continued polymerization, and also serve to thermally insulate the reactor wall, preventing efficient cooling. These "hot spots" may rise to a temperature above the melt temperature of the polyolefin, causing the particles to melt together to form clumps, agglomerates, and sheets. These fused or partially fused artifacts may slough off the reactor walls and then tend to block takeoff lines for polymer particle product. They also must, in general, be removed from the polymer particle product. One proposed method for preventing such sheeting phenomena is to deactivate small catalyst/polymer particles by adding glycols, glycol ethers, or sorbitan monooleate, as disclosed in EP0560035A1. A further method, employing fatty amines deposited on the supported catalyst, is disclosed in U.S. Pat. No. 6,201,076.

Adherence to the reactor walls may occur due to an inherent tackiness of the polymer particles, or may be induced by electrostatic attraction. As the essentially non-conductive polyolefin particles are circulated in the gas phase reactor, electrostatic charges build up, as can be shown, in some cases, by appropriate sensors. The static build-up in gas phase reactors is most pronounced in the lower (up to 1 bed diameter) portion of the reactor, and it is here, also in conjunction with less intense mixing of particles near the wall, that the majority of hot spots and associated sheeting phenomena occur. Reference may be had to U.S. Pat. No. 4,792,592 in this regard, and to U.S. Pat. No. 5,283,278, where "antistats" such as chromium salts of $C_{14-18}$ alkylsalicylic acids are added to the polymerization reactor in Ziegler-Natta catalyzed olefin polymerization.

Generation of hot spots, sheeting, and static buildup have all been the subject of much discussion in olefin polymerization. However, the interrelationship among such phenomena is still not well understood. Moreover, the addition of "antistats" to the polymerization produces quite variable results, and frequently is accompanied by a loss in catalyst activity and/or impairment of polymer physicochemical properties such as polymer particle morphology and bulk density. For example, U.S. Pat. No. 6,140,432 discloses adding a primary, secondary, or tertiary hydroxyalkylamine to a supported catalyst. Such compounds can seriously impair catalyst activity.

In slurry polymerization processes, static buildup is not ordinarily a problem. Moreover, particle velocity is generally high due to continued and rapid circulation of the slurry in the reactor when slurry loop reactors are employed. Antistat-treated catalysts have been proposed for use in such reactors nevertheless, as sheeting problems can still occur. See, e.g., U.S. Pat. No. 6,201,076. However, equally detrimental to the slurry process is a decrease in polymer bulk density exhibited by such catalysts. Lower bulk density can adversely affect harvesting of the polymer from the reactor, i.e. by the use of settling legs or other means which rely on gravitational sedimentation of the polymer from the liquid continuous phase.

It would be desirable to provide a process of olefin polymerization employing supported catalysts wherein the overall polymerization process is improved with respect to the problems discussed above, without incurring the penalty of decreased catalyst activity or production of polymer particles having less optimal physicochemical properties.

SUMMARY OF THE INVENTION

It has now been surprisingly discovered that long chain, essentially hydrophobic molecules having a single reactive functional group which allows them to be tethered to a supported catalyst at a single site, and which do not contain basic nitrogen, provide increased processing operability in gas phase and slurry olefin polymerization processes without significantly lowering catalyst activity or adversely affecting polymer morphology. Polymer bulk density may be increased significantly in slurry processes.

DETAILED DESCRIPTION OF THE PREFERRED EMBODIMENTS

The supported catalysts of the present invention are used in olefin polymerization processes employing supported organometallic catalysts. Such processes include both gas phase polymerization and slurry polymerization. Gas phase polymerization generally involves adding gaseous monomers into a vertically oriented polymerization reactor filled with previously formed polymer, catalyst particles, additives, etc. The rising gas phase fluidizes the bed, and the monomers contained in the gas phase polymerize onto supported catalyst or preformed polymer during this process. Upon reaching the top of the reactor, unreacted monomer is recycled, while polymer continually falls down along the sides of the reactor. Such processes are well known. An example is the Unipol™ process, which is widely used throughout the world, and which is described in U.S. Pat. No. 4,003,712 and other U.S. and foreign patents.

In slurry reactors, a low boiling hydrocarbon solvent such as isobutane, hexane, or heptane is employed as a continuous medium, and monomer, catalyst, etc. added to this continuous phase. The polymer formed is insoluble in the reaction medium, producing a slurry of polymer, catalyst, etc. Slurry reactors may be divided into loop reactors and boiling solvent reactors. In the latter, a vertical reactor, for example a CSTR is employed, and the temperature and pressure are such that the solvent boils. Heat is at least partially removed by the heat of vaporization of solvent, which is later condensed and returned to the reactor. Polymer is removed as a slurry from the bottom of the reactor and flashed to remove solvent, which is recycled.

Slurry loop reactors are tube-within-tube reactors which may be horizontally or vertically oriented. Water flowing between the tubes serves to remove heat and maintain a relatively constant temperature. Slurry flow is achieved by pumps which maintain the polymer slurry at relatively high velocity. Product is removed either continuously, or discontinuously from a "settling leg."

The heterogeneous catalysts of the present invention comprise a finely divided porous inorganic support material which is treated to contain a transition metal or inner transition metal organometallic complex "precatalyst," and at least one activator, preferably an organoalumoxane. The term "precatalyst" is used in the art synonymously with "catalyst" in many cases, and is a preferred term, since the metal complex utilized as a catalyst often has no or only low polymerization activity in the absence of other catalyst system ingredients. The metal complex itself is likely not the actual catalyst, but a precursor thereof. Thus, the term "precatalyst" appears to be a useful term in describing such metal complexes.

The terms "cocatalyst" and "activator" are often used interchangeably. These terms signify a component which, when added to the precatalyst, results in high olefin polymerization activity. The term "activator" will be used herein. While metal alkyls are efficient activators with Ziegler-Natta catalysts, they are not efficient activators for the catalysts of the subject invention. Rather, bulky anions and preferably alumoxanes, are efficient activators. Metal alkyls may be present in small amounts on the catalyst and may augment or modify catalyst system activity. Metal alkyls may also be efficiently used as scavengers for substances which serve to deactivate the catalyst system, for example traces of water which may enter the reactor at low concentrations in reactant feed streams, or solvent feed or recycle feed streams.

Numerous precatalysts are useful. In the context of the present invention, a precatalyst is a transition metal compound or complex, hereinafter, "complex" which exhibits olefin polymerization activity following activation with an alumoxane. The precatalyst is ordinarily a metal complex of a transition metal, preferably of titanium, zirconium, or hafnium. Many suitable precatalysts are metal complexes containing one or more π-bonded aromatic or heteroaromatic ligands, i.e. complexes of the general formula

where A is an aromatic or heteroaromatic, π-bonded ligand such as, but not limited to, substituted or unsubstituted cyclopentadienyl, indenyl, borabenzene, boranaphthalene, pyrolyl, etc., where two A may be linked together by bridging divalent ligands such as alkylene, silyl, and the like, L is a non-π-bonded ligand such as alkyl, halo, alkoxy, cyano, or the like, and n and m are such that the valency of the metal M is satisfied. Non-limiting examples of such catalysts include those disclosed in the U.S. patents cited previously. Particularly preferred precatalysts for gas phase processes include the indenoindolyl complexes disclosed in U.S. Pat. Nos. 6,232,260 and 6,376,629, herein incorporated by reference. In the present application, an organometallic precatalyst is a transition or inner transition metal organic complex which has olefin polymerization activity in the presence of an alumoxane or anionic activator.

Alumoxanes are preferred for use with the supported catalysts of the invention. The alumoxanes are organoalumoxanes as may be prepared, for example, by hydrolysis of aluminum alkyls. Preferred alumoxanes are the methylalumoxanes such as those available commercially as "MAO" and "PMAO." Alumoxanes containing other organo groups such as ethyl, n-propyl, i-propyl, n-butyl, i-butyl, and the like, either instead of or in addition to methyl groups, are also useful. Such alumoxanes containing both methyl and other groups are sometimes referred to as "modified methyl alumoxanes" or "MMAO." Preparation of methylalumoxanes is disclosed in numerous patents, including U.S. Pat. Nos. 5,041,584; 5,066,631; and 5,329,032. In addition to the required alumoxanes, the supported catalysts may include additional "co-activators." Suitable "co-activators" include alkylaluminum compounds (triethylaluminum, diethylaluminum chloride, trimethylaluminum, triisobutyl aluminum) and the like.

In lieu of or in addition to alumoxane activators, the catalyst systems of the subject invention may utilize anionic activators. Anionic activators further include acid salts that contain non-nucleophilic anions. These compounds generally consist of compounds containing "non-coordinating" anions comprising bulky ligands bonded to boron or aluminum. Examples include lithium tetrakis(pentafluorophenyl)borate, lithium tetrakis(pentafluorophenyl)aluminate, anilinium tetrakis(pentafluorophenyl)borate, and the like. Suitable activators also include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157; 5,198,401; and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The support material may be any finely divided, porous inorganic substrate, including without limitation, various aluminas, silicates, silica, etc. Silicates such as aluminum silicate, magnesium silicate, and metal aluminum silicates such as magnesium aluminum silicate are all suitable. Preferred, however, are finely divided silicas such as Davison 948 silica and similar silicas, which are available from numerous sources. The particle sizes, surface areas, pore sizes, and pore volumes are all those conventionally used in the art. For example, but not by limitation, surface area may range from 10 $m^2/g$ to 700 $m^2/g$; pore volume from 0.1 $cm^3/g$ to 5.0 $cm^3/g$ and average particle size from 10 $\mu m$ or less to 500 $\mu m$. More preferably, surface area is in the range of 50 $m^2/g$ to 500 $m^2/g$; pore volume in the range of 1.0 $cm^3/g$ to 4.0 $cm^3/g$, and average particle size in the range of 10 $\mu m$ to 200 $\mu m$. Pore size may range from 10 to 1000 Å, more preferably 50 to 800 Å, and most preferably 75 to 500 Å.

The precatalyst and activator are generally applied to the catalyst support in solution in an acceptable solvent, preferably a hydrocarbon solvent such as toluene, xylene, hexane, heptane, etc. Methods of preparation which involve precipitation by addition of a second solvent in which the component is less soluble, as disclosed by U.S. Pat. No. 4,921,825 may be used, as well as techniques such as those disclosed in U.S. Pat. Nos. 4,808,561; 4,791,180; 4,752,597; 5,635,437; 5,554,704; and 5,240,894, all of the foregoing U.S. patents incorporated herein by reference.

The volume of solution employed may range from less than 0.1 of the pore volume of the silica to many times the pore volume, but is preferably within the range of 0.5 to 10, more preferably 0.5 to 6, and most preferably in the range of 0.8 to 2 of the support pore volume. When limited amounts of solution are employed at any given time, i.e. less than 1.5 times the pore volume, preferably less than 1.0 times the pore volume, the product will remain free flowing and will appear to be dry or only very slightly damp. Solvent may be removed to produce a "dry" catalyst. The catalyst may be reslurried in solvent to facilitate uniform incorporation of precatalyst and alumoxane, or to remove unwanted byproducts or impurities. When larger volumes of solvent are used, a slurry is created. Formation of a support slurry prior to adding the various catalyst system ingredients has been found to improve polymer morphology, and is a further preferred embodiment of the subject invention.

The order of addition of precatalyst and activator is not critical. The precatalyst may be added first, for example, followed by drying and then adding the activator, or this order may be reversed. In addition, the precatalyst and activator may be first mixed together to form a solution, or when the activator is an alumoxane, the precatalyst may be mixed together with limited alumoxane to form a dispersion of solid precatalyst/alumoxane reaction product particles. Multiple applications of each component may be employed. The ratio of alumoxane to metal precatalyst, calculated as mol Al: mol metal, can be any useful range, for example in ranges disclosed or known to those skilled in the art. Preferably, the Al/M mol ratio is from 0.5 to 1000:1, more preferably 10:1 to 400:1. When bulky anionic activators are employed, the ratio of metal in the organometallic precatalyst to bulky non-coordinating anion from 100:1 to 1:10, preferably 10:1 to 1:1, and more preferably 3:1 to 1:1.

The activated catalyst system particles may be further treated with metal alkyls, antistats, etc., either prior to or following application of the precatalyst and activator. The support material, prior to treatment with catalyst system components may contain substantial hydroxyl functionality, or may be calcined or treated with hydroxyl-reactive hydrophobicizing agents such as hexamethyldisilazane, trimethylchlorosilane, trimethylmethoxysilane, or the like. Preferably, when the support is silica, the support is calcined for several hours at temperatures of 200° C. to 800° C., more preferably 250° C. to 650° C.

The process improving additives may be added to the support at any time during supported catalyst preparation, i.e. prior to addition of the precatalyst and/or alumoxane, between precatalyst and alumoxane addition, concurrently, or following the addition of these components. The process improving additives may be added in portions at one or more stages of supported catalyst preparation.

The "process improving additives" are compounds containing a hydrophobe and a single functional group which enables the compounds to be anchored or "tethered" to the supported catalyst. These process improving additives are termed herein "unifunctional hydrophobic tethers," and are free of basic nitrogen, i.e. primary, secondary, or tertiary amino groups. They may, however, contain quaternary nitrogen.

It has been surprisingly and unexpectedly discovered that the unifunctional hydrophobic tethers of the present invention improve olefin polymerization processes substantially, including reducing sheeting and/or fouling in gas phase polymerization, while avoiding substantial loss in catalyst activity. In some cases, catalyst activity is actually increased. This is in direct opposition to so-called "surface modifiers" typified by U.S. Pat. No. 6,140,432, which employ hydroxyalkyl primary, secondary, and tertiary amines. It has further been surprisingly discovered that the unifunctional hydrophobic tethers may also improve polymer bulk density, particularly in slurry polymerization, and may alter the $MI_2$ and MIR ratios of the polymers produced. $MI_2$ is a standard industry term for melt index at a pressure exerted by a 2 Kg load, while MIR is the $MI_{20}/MI_2$ ratio. The melt index and melt index ratio are of particular importance in the further processing of polyolefins, for example by injection molding, film blowing, extrusion, etc.

The unifunctional hydrophobic tethers have a hydrophobic portion which preferably consists of an unbranched backbone of minimally about 6 carbon atoms if unsubstituted, minimally about 4 carbon atoms if highly fluoro-, preferably perfluoro-substituted, and minimally four hydrocarbon-substituted siloxy units when the backbone is an oligosiloxane. In the case of oligosiloxanes, siloxy groups may be replaced by bridging alkylene groups at a ratio of 2 carbons in the alkylene group to each siloxy group. Similarly, each two carbons of an alkyl group may be substituted by one or more siloxy groups. The unbranched backbone may be substituted by groups which are preferably inert under the reaction conditions, i.e. fluoro, aryl, alkyl, fluoroalkyl, fluoroaryl, alkoxyalkyl, alkoxyaryl, and the like. In addition to the unbranched hydrophobes, branched hydrophobes such as secondary and tertiary alkyl groups, radicals derived from neoalkanes, and aryl- and cycloalkyl-substituted alkyl groups are also suitable, provided that the branched hydrophobes contain at least a six carbon chain. Preferably, the hydrophobic group contains from 12–24 carbon atoms and/or from 5 to 10 siloxy groups. The hydrophobe may also carry ethylenic unsaturation.

Suitable hydrophobes in a non-limiting sense include n-hexyl, n-octyl, 2-ethylhexyl, 2-cyclohexylethyl, n-nonyl, n-decyl, i-octyl, 2,2-dimethyloctyl, n-dodecyl, neodecyl, n-tetradecyl, n-octadecyl, n-eicosyl, 4-(nonylphenyl)butyl, 6-butoxyhexyl, nonamethyltetrasiloxy, 1-trimethylsiloxy-2-dimethylsiloxypropyl, undecamethylpentasiloxy, etc. Aliphatic hydrocarbon hydrophobic portions of the unifunctional hydrophobic tether may also include interspersed oxygen atoms (ether linkages) provided that the resulting ether remains hydrophobic. A ratio of 4 carbon atoms or more to each ether linkage is preferred. Examples include 6-propoxyhexyl and 6-ethoxyhexyl groups.

Preferred hydrophobic groups include $CH_3(CHR)_n$— where R is H, F, $CF_3$, or $C_{1-8}$ alkyl, preferably $C_{1-4}$ alkyl, and preferably H or methyl and n is 5 to 20, preferably 7 to 17; $CF_3(CF_2)_m$— wherein m is from 3 to 17, preferably 5 to 7; and $R_3SiO(R_2SiO)$— where each R individually is $C_{1-8}$ alkyl, preferably $C_{1-0}$ alkyl, more preferably $C_{1-4}$ alkyl, and most preferably methyl, or R is $C_{6-10}$ aryl, each optionally fluoro-substituted.

Preferred organosilicon hydrophobic portions of the unifunctional hydrophobic tether of the subject invention include organopolysiloxanes with from 5 to 10 repeating siloxy groups, generally terminated at one end with a triorganosiloxy group. Preferred organopolysiloxanes include cyclic diorganopolysiloxanes which employ their ring-opening ability to serve both as the hydrophobic portion of the unifunctional hydrophobic tether and the unifunctional reactive group as hereafter defined, and linear or branched oligomeric organopolysiloxanes bearing optionally fluorinated alkyl or aryl groups, preferably optionally fluorinated $C_{1-24}$ alkyl groups, more preferably optionally fluorinated $C_{1-4}$ alkyl, or phenyl groups. The linear and branched organopolysiloxanes preferably contain a terminal or pendant silyl group with reactive functionality as the unifunctional reactive group. -Non-limiting examples of the latter include silyl groups bearing readily hydrolyzable functionality such as halo, preferably chloro; acetoxy; oximino; alkoxy, preferably methoxy or ethoxy; or silicon-bonded hydrogen.

Hydrocarbon-substituted silanes are also preferred unifunctional hydrophobic tethers. Examples include monomeric silanes bearing long chain, optionally fluorinated alkyl groups such as octyldimethylsilane, didodecylmethylsilane, tetradecyldimethylmethoxysilane, octadecylsilane, and the like. These silanes contain reactive groups bonded to the silicon atom, for example acetoxy; oximino; halo; alkoxy; or silicon-bonded hydrogen.

The unifunctional reactive group of the unifunctional hydrophobic tether is attached directly or through a linking group to the hydrophobe. The unifunctional reactive group must be "reactive" with at least one component of the supported catalyst such that it remains substantially tethered during the course of the subsequent olefin polymerization reaction if employed in slurry polymerization. Some loss of unifunctional hydrophobic tether is to be expected. However, if the loss is greater than 50 mol percent based on that initially present, an undesirably large amount of unifunctional hydrophobic tether may be required. The amount not securely tethered may be assessed by tagging the tether and measuring the amount which appears in the polymerization process continuous phase following removal of all solids by filtration. Loss of tethered hydrophobes is ordinarily not a problem.

The functional group used as the tethering group must be monofunctional, i.e. it must have a reactive group at only one site on the unifunctional hydrophobic tether. Thus, additives which employ two reactive groups at each end of a hydrophobic chain are not satisfactory, nor are hydrophobic groups bearing two reactive functionalities attached at different points on the hydrophobic tether, i.e. on two different atoms of the tether.

For example, a hydrophobic tether with a single dimethylmethoxysilyl functionality is clearly a unifunctional hydrophobic tether. However, a hydrophobic tether with a methyldimethoxysilyl or trimethoxylsilyl group on the hydrophobic chain is also a unifunctional tether, since the reactive groups, the methoxy groups, are attached to the same atom (silicon). By contrast, a tether containing two vicinal dimethylmethoxysilyl groups is not a unifunctional tether, since the reactive groups (methoxy) are not located on the same silicon. Thus, tethers containing reactive functionality such as bis(2-hydroxyethyl)amino groups would not be unifunctional within the meaning of the subject invention even were basic amino nitrogen atoms permitted.

Examples of unifunctional reactive groups include, but are not limited to those containing groups such as —OH, —SH, —SiR$_2$H, —SiRH$_2$, —SiH$_3$, —OSiR$_2$H, —OSiRH$_2$, —OSiH$_3$, —OSiR$_2$OR, —OSiR(OR)$_2$, —OSi(OR)$_3$, —OSiR$_2$Cl, —OSiRCl$_2$, —C(O)H, and —NR$_3^+$X$^-$, where R is H or a C$_{1-20}$ hydrocarbon, and X$^-$ is an anion, preferably a halide. Further examples include epoxy groups, aluminate, and borate groups, i.e. aluminate or borate salts of fatty carboxylic acids. If not connected directly to the hydrophobe, the tethering group may be bonded through a spacer group such as an ester, urethane, or ether linkage or the like.

The amount of unifunctional hydrophobic tether may be varied over a relatively wide range, but is preferably from 0.1 mol to 100 mol per mol of precatalyst metal, more preferably 0.5 to 10 mol, and most preferably in the range of 0.8 to 4 mol. For example, with zirconium based precatalysts, a ratio of 2 mol of process improving additive per mol Zr has been found advantageous. The optimal amount can be determined by preparing otherwise identical catalysts with varying amounts of unifunctional hydrophobic tether. Ideally, the unifunctional hydrophobic tether will be effective in reducing undesirable polymerization events such as fouling and sheeting, and will substantially maintain or even increase catalyst polymerization activity (Kg polymer/g metal) and polymer bulk density.

The unifunctional hydrophobic tether may be added to the support prior to addition of precatalyst and alumoxane, subsequent thereto, or simultaneously therewith, or combinations of these modes of addition may be practiced, as indicated previously. The additive is generally added dissolved in solvent such as toluene, xylene, aliphatic hydrocarbons, ethers, etc. With alumoxane activators, a preferred method of addition is to add the additive to a solution or dispersion of alumoxane and deposit a portion of this solution onto the support, following which the precatalyst is added to the remainder of the additive/alumoxane solution and deposited. The treated support may be washed with solvent to further distribute components and/or to remove components not fixed to the support. The catalyst may be dried or used in slurry form, in the same or a different liquid phase. Continued presence of the unifunctional hydrophobic tether on the supported catalyst following washing in organic solvents such as heptane is evidence that the unifunctional hydrophobic tether has been reacted or "tethered" to the supported catalyst.

The volume of the solution containing the additive, optionally also containing the activator and/or precatalyst, may be adjusted in view of the desired method of addition to the support. Larger volume, more dilute solutions are used if a catalyst slurry or paste is to be prepared, while smaller volumes of more concentrated solutions are employed with incipient wetness methods. Spraying techniques may also be used where the various catalyst components dissolved in solvent are sprayed through a spray nozzle or atomizer onto agitated support.

In one embodiment of the present invention supported catalyst manufacturing process, it is preferred that the total volume of solution added to the support at any given time be such that a dry-appearing or only slightly damp product is obtained. Between additions of various components of the catalytic system to the support, the catalyst may be dried by removing previously applied solvent preferably under vacuum. By such methods, formation of a paste or slurry can be avoided during catalyst system component deposition. Supported catalysts thus formed have been found to generally provide more optimal results, even when subsequently washed with relatively large volumes of solvent, at which time a slurry is necessarily formed.

In a further preferred embodiment, a slurry process is employed to prepare the supported catalyst. In contrast to prior slurry methods, where the support, i.e. calcined silica, is added to an activator solution, preferably an alumoxane solution, in this preferred embodiment, the support is first slurried in hydrocarbon solvent, or hydrocarbon solvent containing an insubstantial amount of activator, i.e., when alumoxane is the activator, 10 weight percent or less of the total alumoxane to be added. Preferably, only solvent is used. The alumoxane or remaining portion of alumoxane is then added in one or more subsequent steps, optionally concurrently, in any given step, with precatalysts.

Thus, the support may be first slurried in hydrocarbon, employing for example about 2 to 10 times the support pore volume of solvent, preferably 2.5 to 4 times the pore volume, to produce a slurry or wet paste, following which alumoxane solution is added slowly with stirring. Subsequently, the precatalyst is applied in solution, preferably concurrently with additional alumoxane. The final aluminum to transition or inner transition metal mol ratio may be, for example, but not by way of limitation, from 40:1 to 400:1, preferably 50:1 to 200:1, and most preferably 80:1 to 160:1. Following each addition, the catalyst slurry is generally stirred for a period of 30 minutes to 3 hours, preferably 1 to 1.5 hours. The catalyst product is dried under vacuum, preferably at slightly elevated temperature, i.e., 35° C., to remove solvent and produce a dry-appearing, free-flowing catalyst.

The activator and precatalyst may be added together in a single portion of solvent, a portion of the activator may be first added in a first portion of solvent followed by a second portion of activator in a second portion of solvent, which may advantageously contain at least a portion of the precatalyst. The unifunctional hydrophobic tether, when employed in this embodiment of the invention, may be added at any time, i.e., prior to addition of alumoxane, in the same solution as the alumoxane, where it may partially or fully react with the alumoxane, or subsequent to addition of the other catalyst system components. By the term "catalyst system components" is meant the activator and the precatalyst.

The organic solvents employed to slurry the support and to supply solution(s) of activator, precatalyst, unifunctional hydrophobic tether, scavenger (i.e., TEAL, TIBAL), etc., may be the same or different, and are preferably aprotic solvents such as ketones, ethers, alkylesters, amides, and aliphatic and aromatic solvents. Examples include dimethylketone, methylethylketone, diethylketone, methylacetate, ethylacetate, diethylether, tetrahydrofuran, dimethylformamide, dimethylsulfoxide, acetonitrile, and the like. However, aliphatic and aromatic solvents are preferred, including aliphatics such as pentane, hexane, cyclopentane, cyclohexane, heptane, and common mixtures of these and other paraffinic solvents, and aromatic solvents such as benzene toluene, xylene isomers and xylene isomer mixtures, etc. Mixtures of solvents are advantageously used.

The solvent is selected by one skilled in the art based on properties such as ability to dissolve the requisite amount of the respective compound to be supplied, relative freedom from potentially interfering species, such as free acids in the case of ester solvents, ability to be supplied in relatively pure form or easily purified, i.e., to remove traces of water; and ease of removal from the final catalyst slurry. Toluene is the preferred solvent.

The supported catalyst components can be added in any order and in any combination, in single or multiple portions, so long as the support is initially slurried in solvent substantially free of catalyst system components (activator and precatalyst). It is desired that this initial slurry is totally free of such components, however it would not depart from the spirit of the invention to include a most minor portion of said components, in amounts low enough such that an improvement in catalyst activity and/or polymer morphology is still achieved relative to a catalyst prepared in the conventional manner, wherein the initial solution added to the dry support contains a significant quantity, i.e., 20 weight percent or more of total activator and/or precatalyst.

The activity of catalysts prepared by this solvent slurry method is surprisingly higher than conventional catalysts, in many if not most cases, even higher than catalysts prepared by the incipient wetness technique. Improvement in polymerization rate and productivity of 20–40% can be achieved. Moreover, the polymer morphology, particularly with regard to formation of larger agglomerates, i.e., those >2 mm in size, is decreased, even without addition of the process improving additives of the subject invention, or of other additives such as antistats and the like. Since the catalyst is a relatively high cost component of olefin polymerization, these improvements in polymerization rate and productivity are highly commercially important.

The above method has been described for use with alumoxane activators, but can be used with non-coordinating, bulky anion activators as well. It was surprising that initially slurrying the support in a liquid comprising substantially only solvent creates a catalyst with markedly higher activity.

The olefin polymerization processes in which the subject invention supported catalysts are useful include, as indicated previously, both gas phase and slurry processes. Ethylene and propylene are the preferred monomers, often in conjunction with copolymerizable comonomers. Preferred comonomers include $C_{4-12}$ mono and diolefins such as 1-butene, 1-pentene, 1-hexene, 1-octene, 1-decene, 1-dodecene, 1,5-hexadiene, cyclohexene, and norbornene. Propylene may also be a comonomer in ethylene polymerization, and vice versa. Other copolymerizable monomers such as vinyl esters, styrene, and the like may also be used.

The Examples which follow serve to illustrate catalyst preparation and use of the catalysts in gas phase and slurry polymerization processes. The examples are illustrative and not limiting. In all the Examples and Comparative Examples unless otherwise indicated, the silica employed has a typical particle size of 40 $\mu$m (10th percentile, 10 $\mu$m minimum, 10 $\mu$m typical; 50th percentile, 35–49 $\mu$m; 90th percentile, 97 $\mu$m maximum, 80 $\mu$m typical), a surface area of from 280–355 $m^2/g$ (300 $m^2/g$ typical), and a pore volume of 1.55–2.00 $cm^3/g$ (1.65 $cm^3/g$ typical).

EXAMPLES 1 AND 2 AND COMPARATIVE EXAMPLES C1 AND C2

To 8.5 mL 30% methylalumoxane solution in toluene (38.8 mmol Al) is added 0.40 mmol of unifunctional hydrophobic tether, and the resulting mixture stirred at ambient temperature for 30 minutes. 2.1 mL of this mixture is added dropwise to 6.00 g calcined silica with vigorous agitation employing a paddle-type stirrer. Stirring was continued for an additional 30 minutes following addition of the methylalumoxane/unifunctional hydrophobic tether mixture. 104 mg of precatalyst complex, (5,8-dimethyl-5,10-dihydroindeno[1,2-b]indolyl)-cyclopentadienyl zirconium dichloride was added to the remainder of the methylalumoxane/process improving additive mixture and the mixture stirred at ambient temperature for 30 minutes. The mixture was then added dropwise to the treated support and the resulting solid stirred at ambient temperature for one hour. The solid catalyst was dried under vacuum at 35° C. for 2 hours. 4.0 g of dried catalyst was washed four times with a total of 190 mL heptane, then dried under vacuum at 35° C. for 90 minutes. The catalyst of Comparative Example C1 contained no additive, while the catalyst of Comparative Example C2 contained no unifunctional hydrophobic tether as that term has been defined herein, but instead was prepared with a conventional antistat or "surface modifier," Armostat® 710.

Bench scale gas phase polymerizations were conducted in a 3.3 L stirred bed gas phase reactor, operated in semi-batch mode, and maintained at 70° C. A 300 g bed of LLDPE powder was charged to the reactor, which was heated and purged with nitrogen to establish an inert atmosphere. After purging, 3.0 mL 0.050 M Al(i-Bu)$_3$ solution was added to the reactor as a scavenger for potential poisons. An appropriate amount of catalyst was charged to the reactor, which was then sealed. Nitrogen was added to the reactor to establish a pressure of 138 psig. A pre-measured amount of 1-hexene, sufficient to create a 1-hexene partial pressure of 1.3 psi, was then added to the reactor, along with sufficient ethylene to bring the total reactor pressure to 300 psig. Ethylene and 1-hexene, in a 1-hexene/ethylene mass ratio of 6.6% were then fed to the reactor to maintain the total reactor pressure. After 320 g of ethylene and 1-hexene had been consumed (2–3 hours), reaction was discontinued by venting and purging the reactor. An amount of polymer equivalent to the amount of 1-hexene and ethylene consumed was removed from the reactor. This process was repeated four times to achieve sufficient bed turnover to generate a representative sample.

Supported catalysts containing no process improving additive (Comparative Example C1), Armostat® 710 bis(2-hydroxyethyl)-9-octadecene-1-amine (Comparative Example C2), and two unifunctional hydrophobic tether-treated catalysts according to the present invention were employed in ethylene/hexene gas phase polymerization as described above. The results are presented below.

TABLE 1

| Ex. | Modifier | Activity g/g cat hr | MI$_2$ dg/min | MIR | M$_w$/M$_n$ | Bulk Density g/cm$^3$ |
|---|---|---|---|---|---|---|
| Comp. Ex. C1 | None | 550 | 1.5 | 17.5 | 2.8 | 0.442 |
| Comp. Ex. C2 | Armostat ® 710 | 500 | 1.8 | 17.3 | 2.8 | 0.440 |
| Ex. 1 | Me$_2$(MeO)SiC$_{18}$H$_{37}$ | 610 | 1.5 | 18.0 | 2.9 | 0.465 |
| Ex. 2 | H$_3$SiC$_{18}$H$_{37}$ | 550 | 0.68 | 20.4 | 2.7 | 0.467 |

It is noted from the above examples that Armostat® 710, a commonly used antistatic agent, decreased catalytic activity as compared with a supported catalyst free of Armostat® 710. The unifunctional hydrophobic tethers of Examples 1 and 2 either maintained or actually increased catalytic activity in these bench scale tests. Bulk polymer density also increased somewhat, although all bulk densities were relatively high.

EXAMPLE 3 AND COMPARATIVE EXAMPLE C3

A supported catalyst was prepared in accordance with U.S. Pat. No. 6,232,260, employing (cyclopentadienyl)(10H-indeno[3,2-b]indolyl)zirconium dichloride as the pre-catalyst. To 3.0 lb (1.34 Kg) of silica which had been calcined for 5 hours at 482° F. (250° C.) was added 0.94 lb (420 g) of a premix of 3.84 lb (1.71 Kg) 30% by weight MAO in toluene and 24 g (30 mL) octadecylsilane. All preparations and additions were performed under dry nitrogen. The mixture was added to the silica in spray shots at a rate of approximately 0.045 lb/min (20 g/min) such that the addition was complete in about 30 min. The reactor contents were mixed for one hour at room temperature. To the remainder of the MAO/octadecylsilane premix was added 22.7 g (cyclopentadienyl)(10H-indeno[3,2b]indolyl) zirconium dichloride. The mixture was added to the agitated, previously treated silica in spray shots as before, over a period of 1–1.5 hours. The reactor was then connected to a vacuum line and the reactor jacket temperature control set to 110° F. (43° C.). Solvent was removed until the treated silica appeared dry, ca. 4–8 hours. The temperature was then reset to 65° F. (18.3° C.) and 29 lb (13 Kg) heptane added, stirred for 4 hours, and decanted. Additional portions of heptane 3×18 lb (8 Kg) were then added, stirred for 0.5 hour each, and respectively decanted. Vacuum was restarted and residual solvent removed at 110° F. (43° C.). The Zr loading on the catalyst is nominally 0.20 weight percent.

Evaluation of the unifunctional hydrophobic tether-treated supported catalyst was made in a pilot plant gas phase reactor, and compared to an ethylene polymerization employing a conventional supported catalyst of the same type and Zr loading. The reactor configuration is similar to that disclosed in U.S. Pat. No. 4,003,712, incorporated herein by reference. The catalyst feed to the reactor was begun after the reactor had been inventoried with ethylene (50 mol %), hexene (1.0 mol %), isobutane (25 mol %), and nitrogen (24 mol %). Slow reaction was observed until after the first 10 hours, the end of the start up period noted by a slight decrease in the inlet gas temperature and reactor static at both the A and B probes becoming negative. The catalyst feed was then gradually increased to increase production rate. The results are summarized in Table 2 below.

TABLE 2

| Run | Example 3 | Comp. Example C3 |
|---|---|---|
| Comments | Very few chunks at the run end; fine powder | Small chunks Few lbs/day |
| Powder Properties | | |
| MI$_2$ | 0.5 to 1.1 | 1.1–1.4 |
| Density, g/cm$^3$ | 0.922–0.924 | 0.9205 |
| Bulk Density, lb/cu ft (g/cm$^3$) | 25.7 to 27.7 (0.411 to 0.442) | 27.5 (0.440) |
| Reactor Concentrations | | |
| Ethylene | 50 mol % | 50 mol % |
| Hexene | 1–1.4 mol % | 1.45 mol % |
| Isobutante (inert) | 25 mol % | 25 mol % |
| Nitrogen | 24 mol % | 24 mol % |
| Hydrogen | None | None |
| Catalyst Productivity, g/g | 1800 | 1500 |
| Reactor Static, "A" Probe at 12" level | +1200 V avg. | +2100 V avg. |

The results presented in Table 2 show a surprising increase in catalyst activity over a similar catalyst containing no unifunctional hydrophobic tether. The catalyst productivity increased from 1500 Kg polymer/g Zr to 1800 Kg polymer/g Zr, a commercially significant increase. However, equally important was an increase in process operability. Although "chunks" of polyethylene were produced in both the comparative and subject invention examples, the unifunctional hydrophobic tether-treated catalyst produced relatively small chunks while the chunks produced by the comparative catalyst included "coral type" pieces. The morphology of the chunks in the subject invention process represents a distinct improvement. Further noteworthy is the significant decrease in static, as measured at the "A" probe located at the 12 inch (30 cm) level in the reactor. The static of the run employing the subject invention catalyst remained both low (+1200V) and relatively uniform, while the run employing the comparative catalyst exhibited both a higher average value (+2100V) as well as a higher fluctuation.

EXAMPLE 4–9 AND COMPARATIVE EXAMPLES C4 AND C5

A series of supported catalysts were prepared on calcined silica by a procedure similar to that described for Example 1, except that the precatalyst was bis(cyclopentadienyl) zirconium dichloride, with MAO as the activator in an Al/Zr mol ratio of 200. Various unifunctional hydrophobic tethers were employed, in a ratio of 2 mol unifunctional hydrophobic tether to 1 mol Zr. The various supported catalysts were tested for performance in a lab scale slurry reactor employing isobutane as the slurry medium, and 1-butene as comonomer. The LLDPE polyethylene produced had a nominal density of 0.92 g/cm$^3$. Catalyst productivity, melt index, melt index ratio, and bulk density were measured for each additive, as well as for a similar catalyst containing no additive and one containing a traditional "antistat," Armostat® 710. Results are presented in Table 3 below.

TABLE 3

| Example | Unifunctional Hydrophobic Tether | Reactivity (Kg/g/hr) | MI$_2$ | MIR | M$_w$ | Bulk Density g/cm$^3$ |
|---|---|---|---|---|---|---|
| C4 | None | 296 | 2.52 | 27.7 | 87,090 | 0.323 |
| C5 | Armostat ® 710* | 106 | 0.99 | 30.1 | 112,525 | 0.265 |
| 4 | CH$_3$(CH$_2$)$_{15}$N$^\oplus$(CH$_3$)$_3$Br$^\ominus$ | 257 | 0.82 | 36.8 | 110,840 | 0.341 |
| 5 | Octadecylsilane | 227 | 0.50 | 26.6 | 131,000 | 0.357 |
| 6 | 1-octadecanol | 212 | 0.23 | 47.8 | 147,000 | 0.330 |
| 7 | Methoxydimethyl-octadecylsilane | 203 | — | — | 146,000 | 0.393 |
| 8 | Aluminum monostearate | 187 | 0.24 | 44.6 | 142,000 | 0.36 |
| 9 | Decamethylcyclopentasiloxane | 300 | 0.15 | 55.3 | 152,000 | 0.262 |

*Armostat ® 710 is not a unifunctional hydrophobic tether

The results presented in Table 3 indicate that, relative to Armostat® 710, all the unifunctional hydrophobic tethers of the subject invention exhibit a much higher catalyst productivity. However, yet more surprising are both the increase in weight average molecular weight achieved when the unifunctional hydrophobic tethers of the subject invention are used, as well as the increase in bulk density achieved. The latter is an important property in olefin slurry polymerization processes. Only decamethylcyclopentasiloxane failed to show an increase in polymer bulk density. However, this unifunctional hydrophobic tether exhibited approximately the same activity as the unmodified supported catalyst, a molecular weight some 74% higher, and a catalyst production three times higher than Armostat® 710.

Other catalyst preparation methods are believed to produce similar results. For example, a slurry method has been used in the past to form supported catalysts where the volume of liquid exceeds the pore volume substantially, forming an initial slurry prior to drying. Example 9 and Comparative Example C6 below illustrate the improvement possible with the present invention in these types of supported catalyst, while Example 10 and Comparative Example C7 illustrate the improvement in activity obtained by the improved slurry process per se, i.e., without any modifier present so a direct comparison with respect to the catalyst preparation process can be made.

EXAMPLE 9 AND C6

Bis(cyclopentadienyl)zirconium dichloride precatalyst, MAO, and Armostat® 710 (Comparative Example C6) or 1-octadecanol (Example 9) are supported on calcined silica by the slurry method, following which the supported catalyst is dried in vacuo. The additive loading is 0.22 mmol/g silica. The supported catalysts are tested for activity in a bench scale gas phase reactor. The catalyst of the subject invention displayed a productivity of 1.7 Kg/g (Example 9) while the comparative catalyst exhibited a productivity of only 0.100 Kg/g.

EXAMPLE 10 AND COMPARATIVE EXAMPLE C7

A catalyst in accordance with the subject invention was prepared by slurrying 4.01 g Crosfield ES 757 silica, calcined for 12 hours in fluidizing dry nitrogen at 250° C., in 20 mL toluene. To the slurry was added 3.3 mL of 30% methylalumoxane (toluene solution, 13.6% Al, 0.92 g/mL (Albemarle), 15 mmol) dropwise with stirring. The slurry was stirred at ambient temperature for 1 hour. The precatalyst (cyclopentadienyl) (10H-indeno[3,2-b]indolyl zirconium dichloride (23.9 mg, 0.443 mmol) was dissolved in 4.9 mL 30% methylalumoxane in toluene (23 mmol Al) and the mixture stirred for 1 hour under nitrogen. The resulting solution was added dropwise to the methylalumoxane-treated silica slurry and the resultant supported catalyst slurry was stirred at ambient temperature for 90 minutes. The solvent was removed in vacuo at 35° C. over 90 minutes, resulting in a dry-appearing, free-flowing powder.

A catalyst (Comparative Exanple C7) was similarly prepared, but the silica was not slurried in toluene prior to adding methylalumoxane.

Ethylene/hexene copolymerization was conducted in the gas phase employing the two catalysts, at 300 psig, an ethylene concentration of 49.7% and a hexene concentration of 1.3%. The results are presented in Table 4 below.

TABLE 4

| Catalyst from Example | Amount | TiBAL | Rate[1] (g polymer/g cat/hr) | Productivity (g polymer/g Zr) | Particles >2 mm (g) |
|---|---|---|---|---|---|
| 10 | 1.19 g | 3.00 g | 1182.5 | 2689 | 0.5 |
| C7 | 1.17 g | 3.00 g | 856.4 | 2151 | 10 |

[1]Rate over hours 1–2 of run

As can be seen from Table 4, the slurry catalyst preparation method of the present invention (catalyst of Example 10) produced a 38% increase in polymerization rate (g polymer/g catalyst/hr) and a 25% increase in productivity (g polymer/g Zr), with the same catalyst stoichiometry. Moreover, particle morphology improved noticeably, with the number of particles of size >2 mm decreasing from 10 g to 0.5 g. Scaled with respect to total polymer produced, this represents only 4% of the amount of large size particles obtained with the catalyst prepared conventionally. Use of the process improving additives of the present invention would be expected to improve polymer morphology further.

EXAMPLE 11

A supported catalyst was prepared by the method of Example 10, employing 237 mg (0.439 mmol) of precatalyst. However, instead of the initial methylalumoxane solution addition to the slurried support, 3.3 mL of a solution prepared by adding 241 mg of 1-octadecanol (0.891 mmol) to 8.3 mL 30% methylalumoxane (dissolved in toluene). the catalyst slurry was dried in vacuo at 45.8° C. for 1.5 hours.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more than one" unless indicated otherwise.

What is claimed is:

1. In an olefin polymerization catalyst suitable for the polymerization of one or more olefin monomers in which a heterogeneous catalyst comprising an organometallic precatalyst is employed with an activator on a particulate, porous inorganic support, the improvement comprising:

depositing onto said heterogeneous catalyst, a unifunctional hydrophobic tether comprising a hydrophobic portion and a unifunctional reactive group, said unifunctional hydrophobic tether being free of basic nitrogen, and tethered to said heterogenous catalyst at but a single site on said heterogenous catalyst.

2. The catalyst of claim 1 wherein the hydrophobic portion of said unifunctional hydrophobic tether comprises a $C_{6-24}$ branched or unbranched, optionally fluorinated aliphatic hydrocarbon group, a highly fluorinated aliphatic hydrocarbon containing minimally 4 carbon atoms; an organopolysiloxane containing at least 5 silicon atoms, or a compound containing both Si—C bonded aliphatic hydrocarbon moieties and diorganosiloxy moieties wherein the sum of half the number of carbon atoms in the aliphatic hydrocarbon moieties plus the number of silicon atoms in the diorganosiloxy groups is minimally 4.

3. The catalyst of claim 1, wherein said unifunctional reactive group is selected from the group consisting of hydroxyl, epoxy, quaternary ammoniumm, thiol, aldehyde, hydrolyzable silane, Si—H functional silane, aluminate, and borate.

4. The catalyst of claim 1, wherein said hydrophobic portion comprises a $C_{10-24}$ optionally branched aliphatic hydrocarbon, a perfluorinated $C_{6-10}$ aliphatic hydrocarbon, or an $Si_{5-10}$ diorganopolysiloxane.

5. The catalyst of claim 1, wherein said unifunctional hydrophobic tether is selected from the group consisting of fatty alkanols, $C_{8-24}$-substituted silanes, and fatty quaternary ammonium halides.

6. The catalyst of claim 1, wherein said unifunctional hydrophobic tether is applied to said porous inorganic support dissolved in a volume of solvent which is less than 1.5 times the pore volume of the porous inorganic support.

7. The catalyst of claim 1, wherein said unifunctional hydrophobic tether is applied to said porous inorganic support in admixture with an alumoxane in organic solvent.

8. The catalyst of claim 1, wherein a first portion of unifunctional hydrophobic tether is added to said porous inorganic support in admixture with a first portion of an alumoxane in solvent in a total amount of liquid which is less than twice the pore volume of said porous inorganic support, solvent is optionally removed, and a second portion of said unifunctional hydrophobic tether, a second portion of an alumoxane, and at least a portion of said single site precatalyst in solvent are added, the amounts of liquid phase being such that a slurry is not formed.

9. The catalyst of claim 1, wherein said activator consists essentially of an alumoxane.

10. The catalyst of claim 1, wherein said activator comprises a bulky anionic ligand.

* * * * *